United States Patent [19]

Löfberg

[11] 4,264,665
[45] Apr. 28, 1981

[54] REFLEX DEVICE WITH MARKING BEHIND COVER LAYER

[76] Inventor: Hans F. Löfberg, Fridagatan 8, 133 12, Älta, Sweden

[21] Appl. No.: 946,033

[22] Filed: Sep. 26, 1978

[30] Foreign Application Priority Data

Sep. 28, 1977 [SE] Sweden .............................. 7710837

[51] Int. Cl.³ .............................................. G02B 5/128
[52] U.S. Cl. ...................................... 428/172; 428/66; 428/67; 428/68; 428/194; 428/203; 428/204; 428/913
[58] Field of Search ................... 428/156, 29, 38, 913, 428/161, 163, 167, 172, 203, 204, 157, 64, 66, 67, 68, 194; 40/612, 615, 453, 454, 1.5 R, 582; 350/97, 105

[56] References Cited

U.S. PATENT DOCUMENTS

| | | | |
|---|---|---|---|
| 1,475,430 | 11/1923 | Curwer | 40/454 |
| 2,522,812 | 9/1950 | Bonnet | 40/454 |
| 2,951,419 | 9/1960 | Lemelson | 428/29 X |
| 3,357,772 | 12/1967 | Rowland | 428/156 X |
| 3,407,523 | 10/1968 | Winston | 63/19 X |
| 3,768,434 | 10/1973 | Pinter | 350/97 X |
| 3,853,675 | 12/1974 | Edwards | 40/615 X |
| 3,935,359 | 1/1976 | Rowland | 428/172 |
| 3,965,598 | 6/1976 | Avery | 40/615 X |
| 3,970,033 | 7/1976 | Linder et al. | 40/582 X |
| 3,973,342 | 8/1976 | Gubela | 40/582 |
| 4,025,674 | 5/1977 | Mizuochi | 428/29 |
| 4,082,426 | 4/1978 | Brown | 40/615 X |
| 4,127,693 | 11/1978 | Lemelson | 428/29 X |
| 4,138,515 | 2/1979 | Dial | 428/187 |

*Primary Examiner*—Marion McCamish
*Attorney, Agent, or Firm*—Fleit & Jacobson

[57] ABSTRACT

A reflex device has a marking or other particular distinctive feature provided on a carrier which is located behind a covering layer having a light reflectivity and a light transmission varying in response to the direction of incidence of incident light. The covering layer offers the highest reflectivity and the lowest transmission to light having a direction of incidence substantially perpendicular to said layer.

2 Claims, 4 Drawing Figures

REFLEX DEVICE WITH MARKING BEHIND COVER LAYER

The present invention relates to a reflex device of the kind provided with a marking or other particular distinctive feature, such as a picture, a text, a certain colour and/or pattern. The invention is especially concerned with reflex devices of the kind generally referred to as reflex tags or reflex tapes. However, the invention is not restricted to this particular field of use. Instead, it may be utilized also in connection with other types of reflex devices.

Since long ago, reflex tags and other reflex devices have often been provided with a marking, such as a warning text, an advertising message, or a picture. On known reflex tags, the desired information has been applied through printing it on one or the other of the outer sides of the tag. However, such an application of a visual information on a reflex tag is unfavourable as the applied printing ink will reduce the capability of the tag to fulfil its primary purpose, i.e. to serve as a light reflecting means.

An object of the invention is to provide an improved reflex device of the kind initially specified which makes it possible to avoid any reduction of the light reflecting capability of the reflex device due to any desired marking or other particular distinctive feature to be applied on the reflex device. According to the invention, for this purpose, there is provided a reflex device of said kind, wherein said marking or other particular distinctive feature is provided on a carrier which is located behind a covering layer having a light reflectivity and a light transmission varying in response to the direction of incidence of incident light, said layer offering the highest reflectivity and the lowest transmission to light having a direction of incidence substantially normal to said layer.

The invention makes it possible to provide the reflex device with a marking or, for instance, to colour it over its whole area without causing any reduction at all of the reflectivity. The desired marking or colour may furthermore be provided in any suitable manner on the carrier.

In a preferred embodiment of the invention, the covering layer consists of a plastic film having an even outer surface, while it is provided, on its inner side, with a multiplicity of impressions or depressions arranged according to a regular pattern to cause a prism-like surface structure giving rise to the desired light reflecting property of the covering layer. The use of such a covering layer is favourable from several points of view. Inter alia, such a film is comparatively inexpensive. Moreover, it can easily be mounted on an underlying carrier. Additionally, it makes it possible to make the reflex device flexible.

The proposed reflex device may advantageously be formed as a reflex tag. In this case, the device may consist of two covering layers with light reflecting properties, which are turned away from each other, and at least one intermediate carrier provided with a marking or other particular distinctive feature. In order to facilitate low manufacturing costs, the carrier as well as the covering layer, or each covering layer, respectively, may consist of a film of thermoplastic material, the various components of the device being joined together by means of welding seams extending along at least portions of the edges of the reflex device.

Below the invention will be described in further detail, reference being had, by way of example, to the accompanying diagrammatic drawing, in which.

Figure 1:
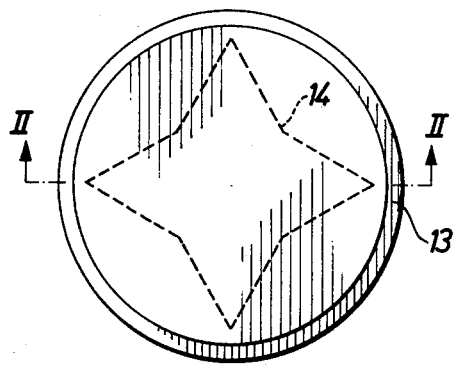
FIG. 1 shows a plan view of a reflex tag according to a first embodiment of the invention.
Figure 2:
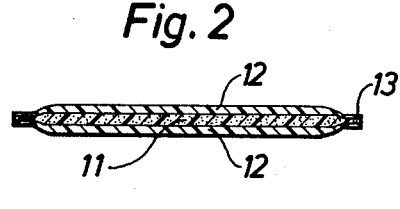
FIG. 2 shows a section through said tag taken along line II—II in FIG. 1.

The reflex tag illustrated in FIGS. 1 and 2 has a generally circular shape. It consists of three layers of suitable material which are placed upon each other and comprise a carrier 11 for the desired marking, colour or the like, and two covering layers 12 located on opposite sides of the carrier. The three layers may for instance consist of films of thermoplastic material which are secured together by means of a welding seam 13 extending along the periphery of the tag. On one or both sides thereof, the intermediate layer 11 may be provided with any desired marking or other distinctive feature, for instance in the form of a printed text, symbol or picture. In FIG. 1, there has been shown in dashed lines a star-shaped symbol 14 printed on the upper surface of layer 11.

While layer 11 may consist of any suitable transparent or non-transparent material, the two covering layers 12 should both consist of a transparent material on its side facing layer 11 provided with a multiplicity of impressions or depressions which are arranged according to a regular pattern to cause on said side of each covering layer a prism-like surface structure giving rise to a light reflecting capability. The prism structure should be such that the covering layers will reflect the main portion of any incident light directed perpendicularly to the surface of the covering layer or having a direction forming a limited angle, for instance of not more than 30°, with the normal of said surface, while incident light having a direction of incidence forming a considerable angle, for instance of more than 30°, with said normal will pass substantially unobstructedly through the covering layers. This means that the symbol 14 or any other marking or other distinctive feature provided on layer 11 will appear clearly and distinctly to a user of the tag as soon as he looks on the tag in a direction forming at least said angle with the normal of the tag. Thus, the symbol 14 will be easily observable for any user. However, the reflectivity of the tag will not be influenced by the symbol as the symbol is provided behind the covering layers 12 forming the reflecting means of the tag.

Figure 3:
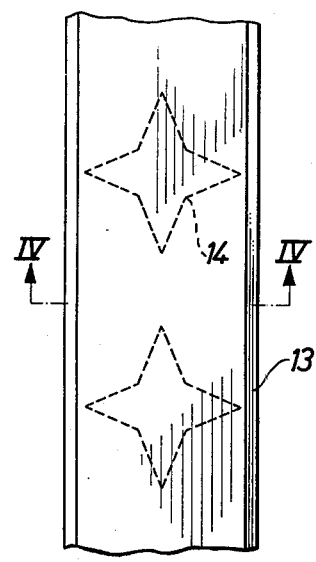
FIG. 3 is a plan view of a reflex tape according to a second embodiment of the invention.
Figure 4:
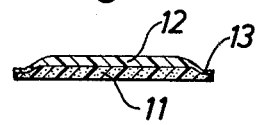
FIG. 4 shows a section through said tape taken along line IV—IV in FIG. 3.

The reflex tape shown in FIGS. 3 and 4 comprises only one covering layer 12 of the reflecting type above described and a layer 11 provided behind said covering layer 12 to form a carrier for symbols 14 provided thereon. Both layers may suitably consist of thermoplastic films which are secured together by means of welding seams 13 extending along the longitudinal edges of the tape.

The two reflex devices above described may be provided with any suitable fastening means or the like. Thus, the reflex tag shown in FIGS. 1 and 2 may for instance be provided with an eyelet in which a string may be mounted to make it possible for a user of the tag to carry the tag loosely hanging in said string. The reflex tape according to FIGS. 3 and 4 may be fixed to an article of clothing or the like by an adhesive provided on the rear side of carrier layer 11. Alternatively, it may be sewn onto such an article or it may be provided with suitable snap fastening means.

The invention is not restricted to the embodiments above described and shown in the drawing. Thus, several modifications are feasible within the scope of the invention. Especially, it should be noted that the carrier need not be provided with a marking consisting of a symbol, a text, a picture or the like. Instead, it may serve only as a support for a particular colour or the like. In such a case the carrier may be covered with a colour on its surface or it may be made from a suitably coloured material.

What is claimed is:

1. A reflex device of the kind for displaying a marking, such as a picture, a text, a certain colour or pattern, wherein said marking is provided on a carrier which is located behind a covering layer, said marking on said carrier being on a side of said carrier facing the covering layer, said covering layer being formed of a thermoplastic film having an even outer surface, and said covering layer having an inner surface arranged facing said carrier and having a multiplicity of impressions or depressions arranged according to a regular pattern to form a prism-like surface structure so as to have a light reflectivity and a light transmission varying in response to the direction of incidence of incident light, said layer offering the highest reflectivity and the lowest transmission to light having a direction of incidence substantially normal to said layer, said device having an edge, said carrier and said covering layer being held permanently in contact with each other as connected by fused joints extending along at least portions of the edge of the device.

2. A reflex device of the kind for displaying a marking, such as a picture, a text, a certain colour or pattern, wherein said marking is provided on a carrier which is located behind a covering layer, said marking on said carrier being on a side of said carrier facing the covering layer, said covering layer being formed of a thermoplastic film having an even outer surface, and said covering layer having an inner surface arranged facing said carrier and having a multiplicity of impressions or depressions arranged according to a regular pattern to form a prism-like surface structure so as to have a light reflectivity and a light transmission varying in response to the direction of incidence of incident light, said layer offering the highest reflectivity and the lowest transmission to light having a direction of incidence substantially normal to said layer, further comprising an additional plastic film covering layer disposed on a side of said carrier opposite to that side of said carrier on which said covering layer is disposed, said covering layer and said additional covering layer having light reflecting properties, wherein the inner surfaces of said layers are turned toward each other facing said carrier, and at least one surface of said carrier is provided with a marking, said device having an edge, said carrier, said covering layer and said additional covering layer being held permanently in contact with each other as connected by fused joints extending along at least portions of the edge of the device.

* * * * *